Figure 1:
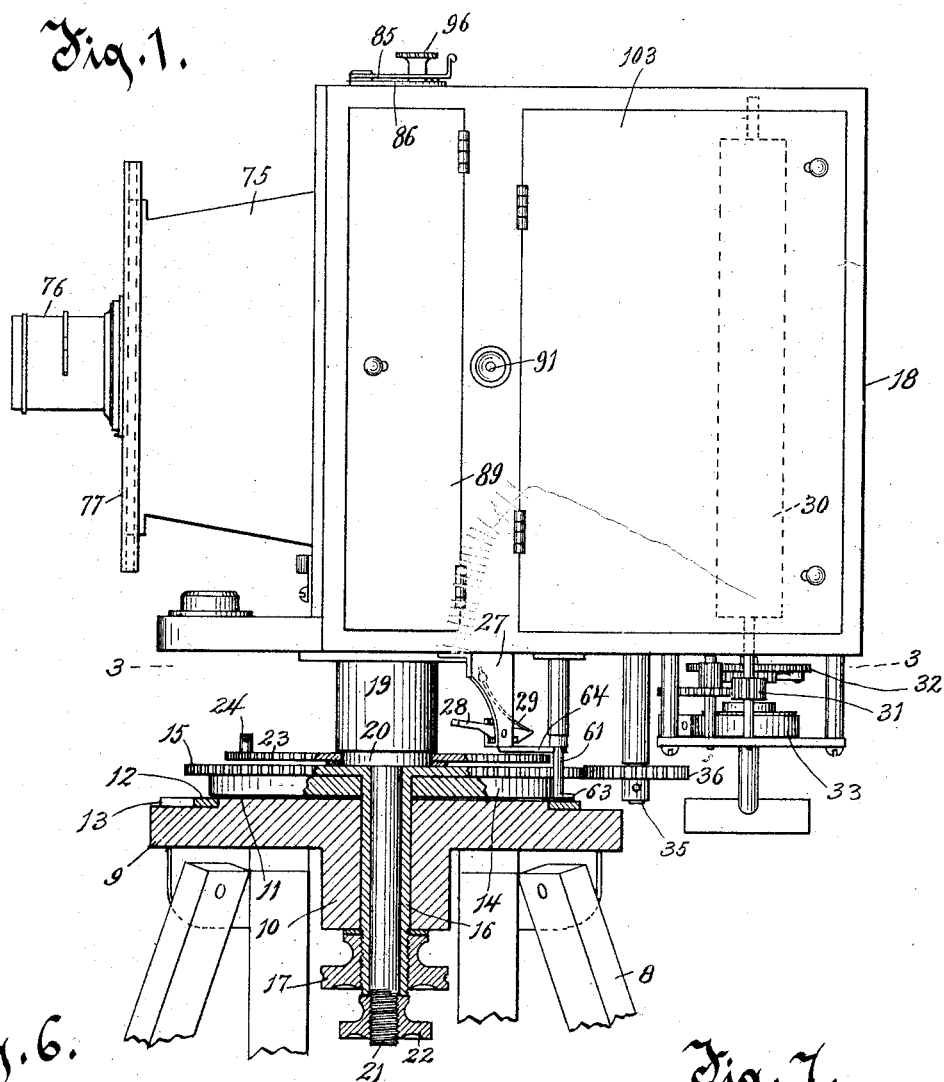

No. 621,545. Patented Mar. 21, 1899.
LE CLAIRE STARK.
PANORAMIC CAMERA.
(Application filed Feb. 28, 1898.)

(No Model.) 3 Sheets—Sheet 1.

No. 621,545. Patented Mar. 21, 1899.
LE CLAIRE STARK.
PANORAMIC CAMERA.
(Application filed Feb. 28, 1898.)
(No Model.) 3 Sheets—Sheet 2.

Witnesses. Inventor.
Le Claire Stark.
By Benedict & Morsell
Attorneys.

No. 621,545. Patented Mar. 21, 1899.
LE CLAIRE STARK.
PANORAMIC CAMERA.
(Application filed Feb. 28, 1898.)

(No Model.) 3 Sheets—Sheet 3.

Witnesses.
O. H. Keeney
Anna V. Faust

Inventor.
Le Claire Stark.
By Benedict & Morsell.
Attorneys.

United States Patent Office.

LE CLAIRE STARK, OF MILWAUKEE, WISCONSIN.

PANORAMIC CAMERA.

SPECIFICATION forming part of Letters Patent No. 621,545, dated March 21, 1899.

Application filed February 28, 1898. Serial No. 671,983. (No model.)

*To all whom it may concern:*

Be it known that I, LE CLAIRE STARK, of Milwaukee, in the county of Milwaukee and State of Wisconsin, have invented a new and useful Improvement in Photographic Cameras, of which the following is a description, reference being had to the accompanying drawings, which are a part of this specification.

My invention has relation to improvements in photographic cameras, more especially of that class known as panoramic cameras, wherein an extended view may be photographed by a single operation.

The primary objects had in view are:

First. To provide a panoramic camera wherein a revoluble cylinder is employed, said cylinder being located just to the rear of the light-opening and thereby forming the focal plane, and wherein the sensitized film is passed in front of the exposed portion of the cylinder, between said cylinder and the light-opening, and is in contact with said cylinder, so as to be moved thereby.

Second. To provide a panoramic camera wherein the light from the lens during an exposure of a view strikes the sensitized film upon a segment of the periphery of a cylinder, that portion of the cylinder so exposed forming the focal plane, whereby compactness in arrangement is secured and the necessity for employing a great number of rolls is avoided.

Third. To provide a photographic camera wherein the cylinder which permits motion to be imparted to the sensitized film is directly propelled by a pinion on a shaft meshing with a gear on the top of the tripod, the cylinder, pinion, and gear being so related and proportioned as to carry progressively into the line of light from the lens during one complete revolution of the camera a length of film precisely equal to the circumference of a circle the radius of which is the equivalent focal length of the lens. By this arrangement the proper length of film is carried into the line of light from the lens and also simplicity is secured and directness and positiveness of action obtained, with no chance for slipping, as in the case of a belt or similar device.

Fourth. To provide a panoramic camera wherein the film which is against the cylinder is pressed into contact with said cylinder by suitable rolls carried by spring-bearings and adapted to revolve and pay out the film at the same speed the cylinder and camera are revolved, and also adapting the film at all times during exposure to be practically the same distance from the lens. By this arrangement the film is obliged to move at the same rate of speed the cylinder and camera are revolved, thereby keeping the film taut and obviating all dragging.

Fifth. To provide an improved construction of automatic shutter which is simple in arrangement and adapted to give full exposure to both ends of the view, the construction also permitting the end of the film to be carried across the front of the cylinder without difficulty.

Sixth. To provide an improved marking device for separating the different views.

Seventh. To provide an improved form of gearing for indicating the end of the view and preventing the transit of the camera.

Eighth. To provide suitable means for preventing the camera from revolving backward.

Ninth. To provide an improved form of revolving tripod top or support for enabling the camera to be easily revolved while composing the view and adjusting the camera without setting in operation the mechanism of the camera proper, and thus moving the film, said revolving tripod-top being adapted to be used in connection with means for fastening said tripod-top when the operation of composing is finished.

With the above primary and other incidental objects in view the invention consists of the devices and parts or their equivalents, as hereinafter more fully set forth.

Figure 2:
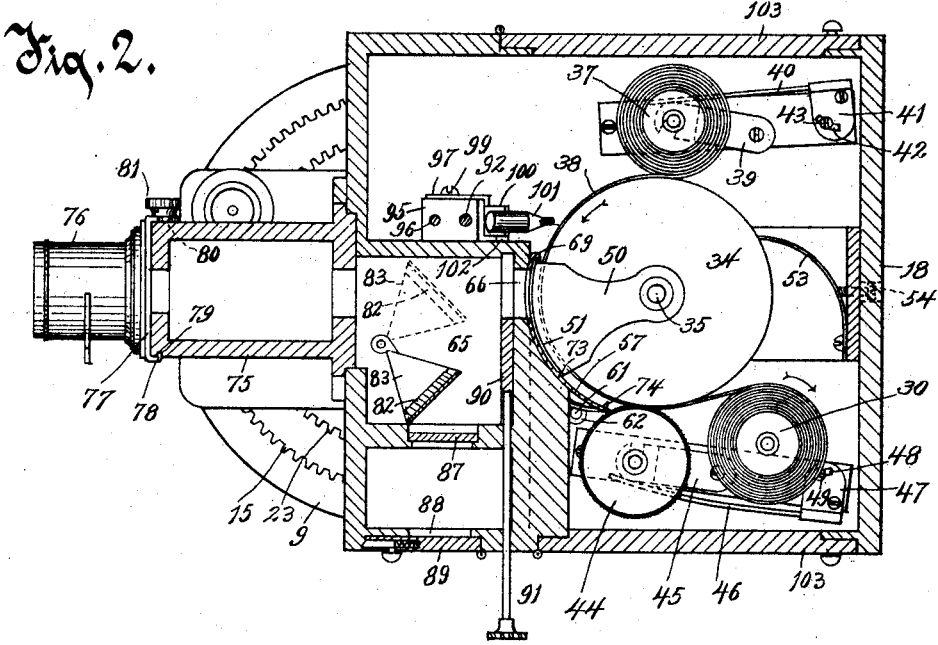
Figure 3:
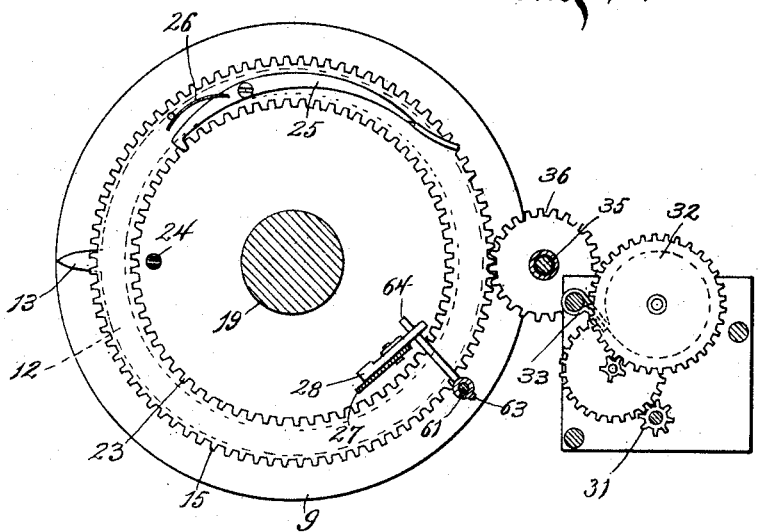
Figure 4:
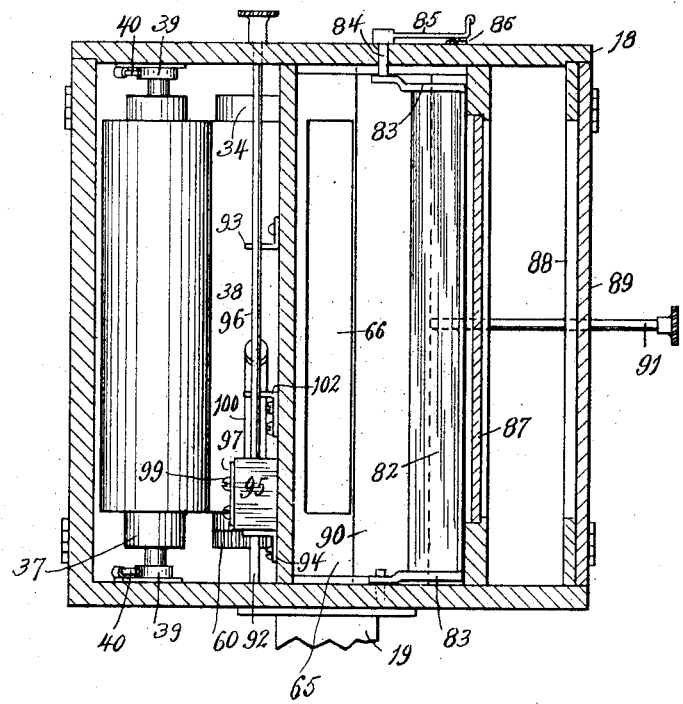
Figure 5:
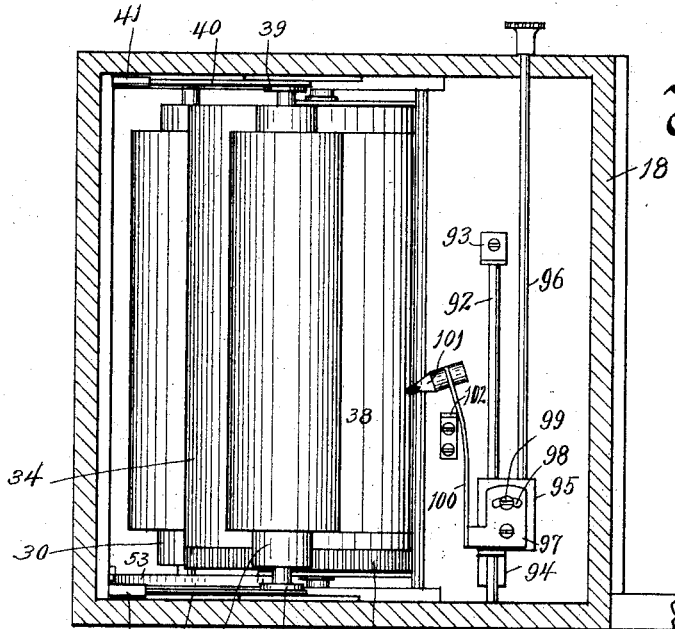

In the accompanying drawings, Figure 1 is a side view with parts of the tripod in section. Fig. 2 is a plan view in horizontal section. Fig. 3 is a section on the line 3 3 of Fig. 1. Fig. 4 is a vertical section through the front of the camera box or casing. Fig. 5 is a side elevation with the box or casing in section. Fig. 6 is a fragmentary view of the lower end of the cylinder and shutter, and Fig. 7 is a detail sectional view through the shutter mechanism.

Referring to the drawings, the numeral 8 indicates the tripod-legs, which are of the usual and well-known form of construction and are connected at their upper converging ends by the top plate 9, said top plate being provided on its under side with a central depending tubular boss 10. The upper surface of this top plate is provided with a central annular raised portion 11, which is surrounded by a loose ring or annulus 12, said ring or annulus provided with a projecting finger or pointer 13. Resting on top of the raised surface 11 is a circular plate 14, the upper edge of said plate being in the form of a toothed wheel 15. Depending from the circular plate is a tubular post 16, which post extends through the tubular boss 10 and projects below said boss for a desired distance. This lower projecting portion is threaded to receive a nut 17, which nut is adapted to be turned against the lower end of the tubular boss, a washer being preferably interposed between the nut and the boss.

The camera box or casing is indicated by the numeral 18. This box or casing has depending from its under side, near its forward end, a cylindrical boss 19. The lower end of this boss is somewhat reduced in diameter, as indicated at 20, and this lower reduced portion rests on top of the toothed wheel 15. The lower reduced portion has also depending therefrom a stem 21, which forms the pivot or axis for the camera box or casing. This pivot or axis extends through the tubular post 16, and its lower end is threaded to receive a nut 22, which nut prevents the camera box or casing from being separated from the tripod-top. Surrounding the reduced portion 20 of the cylindrical boss 19 is a toothed wheel 23, said wheel being held out of direct contact with wheel 15 by means of a suitable spacing-washer. This wheel 23 has projecting from its upper surface, near its periphery, a stud or pin 24, the upper end of said pin being preferably beveled, as clearly shown in Fig. 1. Pivoted to the wheel 15 is a pawl 25, which pawl is normally held in engagement with the toothed wheel 23 by means of a spring 26. Secured to the under side of the camera-box and extending downwardly therefrom is a bracket 27, in which is pivoted a catch 28, said catch being acted upon by the free end of a spring 29.

Arranged vertically within the box or casing and preferably near one corner thereof is a winding-roll 30. The shaft of this roll extends below the box or casing and has thereon a pinion 31, forming part of and actuated by an ordinary clock mechanism consisting of a train of gears 32 and a winding-spring 33.

Arranged vertically at or near the center of the camera-box is a cylinder 34. The shaft 35 of this cylinder passes through the bottom of the box and extends downwardly for a desired distance, the extension carrying a pinion 36, which is in mesh with the toothed wheel 15.

Arranged in the side of the camera-box opposite the side in which the winding-roll 30 is located is a feed-roll 37, from which the sensitized film 38 is unwound. The shaft or axis of this roll has its bearings in pivoted arms 39 39, arranged at the top and bottom of the box. Springs 40 40 act against the arms and tend to press the roll firmly against the cylinder 34. One end of each of these springs is secured to a pivoted plate 41, said plate being provided with a segmental slot 42, through which a set-screw 43 passes. By loosening this set-screw the plate may be turned so as to regulate the tension of the spring.

Bearing against an opposite point of the periphery of the cylinder 34 is a friction-roll 44. The shaft of this roll also has its bearings in pivoted arms 45, engaging opposite ends of said shaft, and these arms are also engaged by the free ends of springs 46, which springs serve to hold the friction-roll in firm engagement with the periphery of the cylinder. One end of each of these springs is also secured to a pivoted plate 47, which plate is provided with a segmetal slot 48, through which a set-screw 49 passes. By loosening the set-screw the plate can be turned so as to regulate the tension of the spring.

The shaft 35 of cylinder 34 has mounted freely thereon, above and below the upper and lower ends of said cylinder, arms 50 50'. The outer ends of these arms project slightly beyond the surface of the cylinder and have secured thereto a segmental shutter 51. The lower arm 50' is formed with a short extension 52, which is engaged by a spring 53, the tension of said spring being adjustable by means of a set-screw 54. (See Fig. 7.) The tendency of this spring is to normally keep the shutter in a closed position. Secured to the shutter is a spring-strip 55, the lower end of said strip being provided with an inwardly-extending pin 56. Seated in a countersunk portion of the lower end of the shutter is a transverse bolt 57, said bolt being provided with elongated slots 58 58, through which screws 59 59 extend, and thereby permit only of a limited movement of the bolt. One end of the bolt is bifurcated, and through this bifurcated portion extends the pin 56, said pin being adapted to normally engage the teeth of an annular rack 60 at the lower end of cylinder 34.

The numeral 61 indicates a vertical shaft which extends through the bottom of the camera-box for a short distance above said bottom and is formed or provided at its upper end with a crank 62, which crank is provided at its extremity with an upwardly-projecting lug. The lower extremity of the shaft 61 is formed with a projecting pointer 63, and medially said shaft carries a projecting finger 64, which extends over the toothed wheel 23.

Immediately in front of the cylinder 34 is a chamber 65. The rear wall of this chamber is provided with a light-opening 66. Immediately back of the rear wall of chamber 65 is a curved plate 67, said plate also having a light-opening 68, which registers with the corresponding opening 66. This plate is curved in the same arc of a circle as the cylinder 34 and has one end flanged inwardly, as indicated at 69, to form a stop for the swinging of the shutter in one direction. It will be noticed particularly from Figs. 6 and 7 that the bolt 57 is provided at a medial point with a projecting stud 70, which is adapted to extend into a recess or slot 71 for its accommodation formed in the plate 67. Fig. 2 of the drawings shows the shutter closed and the pin 56 of the spring-strip 55 in engagement with the teeth of the annular rack 60. Now when the cylinder 34 is revolved in the direction of the arrow, Fig. 2, the engagement of the teeth of the rack 60 with this pin 56 will cause the shutter to be moved with the cylinder. After the shutter has been thus moved a slight distance the stud 70 of the bolt will contact with one end of the recess or slot 71 of plate 67, and this will cause a movement of the bolt 57 in a reverse direction to that in which it was moved with the shutter, the movement in said reverse direction being limited by the screws 59 contacting with the ends of the elongated slots 58 in said bolt. It will be understood that the bifurcated end, hereinbefore referred to, of the bolt 57 has a beveled or raised surface forming a cam, as indicated at 72, and as the bolt thus moves in a reverse direction said cam-surface will act on the pin 56, and thereby throw said pin outwardly out of engagement with the annular rack 60. (See Fig. 7.) It will also be observed that one edge of the shutter is provided with a projection 73. This projection is adapted to pass by the end of a spring 74, so as to be engaged by said spring just before the pin 56 is brought out of engagement with the annular rack 60, so that the moment the disengagement occurs the shutter is prevented from being swung to a closed position by the action of the spring 53.

The front of the box or casing has projecting therefrom an extension forming the usual light-funnel 75. Extending from the front of this funnel is the lens-tube 76. The vertical height of this tube is preferably made adjustable, and for this purpose it is secured to and projects from a plate 77. This plate has its opposite edges flanged around the sides of the funnel for a short distance, and one of these flanges is provided with an inwardly-projecting lip 78, which fits in a corresponding guide-groove 79 of the funnel. The other side flange of the plate is provided with a longitudinal slot 80, through which a set-screw 81 passes and enters the funnel. By loosening this set-screw it is obvious that the lens-tube may be raised or lowered to suit requirements.

Within the chamber 65 is a pivoted composer or view-finder consisting of a mirror 82, said mirror being secured at its upper and lower ends to arms 83 83. The upper arm has extending upwardly therefrom through the top of the box or casing a shaft 84, the upper extremity of said shaft having connected thereto an operating handle or crank 85. The mirror is normally turned to the full-line position shown in Fig. 2. When it is desired to compose or find the view, the mirror is turned to the dotted-line position shown in Fig. 2 simply by manipulating the handle 85, said handle being made to engage a catch 86 in order to hold the mirror to this adjusted position. In the side wall of the chamber 65 is provided an opening, which is closed by a focusing-screen 87, composed of ground glass or other suitable material. The side of the camera box or casing is also provided with an opening 88, which is in register with the glass-covered opening of the chamber 65, said opening 88 being normally closed by means of a door 89. When the mirror is turned to the dotted-line position shown in Fig. 2, it will be seen that it is at an angle to the rays of light coming through the funnel. The object or view on the mirror will therefore be reflected in a right line, so that when the door 89 is opened the object will be plainly discernible through the ground glass 87. After the view is properly composed the mirror of course is turned back to the full-line position shown.

I also prefer to provide my improved camera with a safety-shutter 90, which is located just in front of the opening 66. This shutter fits in suitable guide-grooves and is adapted to be operated by means of a rod 91, projecting through the side of the box or casing. This shutter is advisably pushed to a closed position during the initial adjustment of the camera preparatory to taking a photograph in order to effectually prevent the light from passing through the opening 66 onto the sensitized film should the shutter 51 by any means become accidentally opened.

I also employ in connection with my improvements marking mechanism, whereby a mark is drawn across the sensitized film, so as to separate the different views on the film and thereby act as a guide to determine the proper place for cutting the film. To this end I provide a suitable rail consisting of a rod 92. This rod is connected at its upper end to an angle-iron 93, and its lower end passes through another angle-iron 94. Adapted to travel on the rail is a carriage 95, said carriage having extending therefrom an operating-rod 96, which rod projects through the top of the box or casing. The angle-irons 93 and 94 not only serve as bearings for the rail 92, but also limit the up-and-down movements, respectively, of the carriage. Pivoted to the carriage is a plate 97, said plate being provided with a segmental slot 98. Through this segmental slot passes a screw 99 and enters the carriage. Connected to an extension from the plate 97 is a spring 100, said spring carrying at its end a pencil 101. The upper end of the spring is slanted toward the cylinder 34, and when the carriage is at the lowest point of its travel the pencil is held out of engagement with the sensitized film on the cylinder 34 by the engagement of a bracket or projection 102 with the slanting portion of the spring. On the up movement of the carriage, however, the slanting portion of the spring is pulled above the bracket 102, and this permits the spring to spring toward the cylinder 34, and consequently bring the pencil into contact with the surface of the sensitized film, thereby making a mark across the greater portion of the width of said film. On the down movement of the carriage a mark is likewise made on the film until the slanting portion of the spring is acted upon by the bracket 102, when of course the pencil is drawn out of contact with the paper. The sides of the box or casing are also advisably provided with doors 103 103 for convenience in obtaining access to the interior rolls. It will be understood, however, that the particular form and construction of the box or casing herein shown and described are not absolutely essential, as any other desired form may be substituted in lieu thereof.

An explanation of the operation of my invention will now be given. In the first place care should be taken that the safety-shutter 90 is closed. The nut 17 is now loosened. This will permit of the swinging around together of the top plate 14 and its integral wheel 15, as well as the wheel 23 and the camera box or casing, by reason of the fact that the top plate is held to the wheel 23 by the pawl 25 and the wheel 23 to the camera box or casing by the engagement of the catch 28 with the stud or pin 24. Before this is done, however, the door 89 is opened and the mirror adjusted to the dotted-line position shown in Fig. 2. The parts are swung around, as just explained, until the camera is pointed toward the object at the extreme left of the view desired to be photographed and which is delineated on the ground glass. As soon as this is brought to view the rotation of the parts referred to is stopped and the ring 12 is turned so as to bring the pointer 13 into register with the pointer 63. This pointer 63 therefore determines the terminal point of the view. The camera-box, the wheel 23, and plate 14 are next swung around together in the opposite direction until the camera points toward the object at the extreme right of the view desired to be photographed and which is delineated on the ground glass. The next step is to tighten the nut 17, so as to prevent the plate 14 from rotating, and then release the pawl 25 and catch 28 and turn wheel 23 around until the stud or pin 24 is in register with the pointer 13, and the pawl 25 is then again permitted to engage the teeth of the wheel 23, so as to hold said wheel to its adjusted position. The mirror 82 is now swung around to the full-line position shown in Fig. 2 and the safety-shutter 90 is opened. The camera is now in position for being swung around from the initial point of view for the purpose of taking the photograph. The camera being revolved on its pivot and the wheel 15 being held stationary and being in mesh with the pinion 36, said pinion 36 will be revolved, and hence cause a revolving of the cylinder 34. The revolution of this cylinder will cause the sensitized film to unwind from the roll 37 and wind up on the roll 30 by reason of being pressed into contact with cylinder 34 by friction-roll 44. The surface of the cylinder is preferably roughened, so as to take firm hold of the film and prevent slipping of the same. The roll 44 is also advisably covered with felt or similar material, and the cylinder 34 and roll 44 are somewhat longer than the width of the film, so that the felt comes directly in contact with the roughened surface of the cylinder above and below the edges of the film. At the commencement of the revolution of the cylinder the annular rack 60 at the lower end of said cylinder will act on the pin 56 and cause a quick opening of the shutter 51 in the manner hereinbefore fully pointed out, the shutter being held in its open position by means of the spring 74. After the camera has been revolved a certain distance the finger 64 will contact with the pin 24 and cause a turning of the shaft 61, which shaft will turn the crank 62, and thus throw the spring 74 out of engagement with the projection 73 of the shutter. The moment the shutter is thus released the spring 53, acting on the arm 50′, will cause a swinging of said arm and a consequent turning of the shutter 51 to a closed position. The turning of the shutter carries with it the bolt 57, said bolt moving until the stud 70 thereof comes into contact with the edge of the recess or slot 71 of the plate 67, when of course further movement of said bolt is prevented. The shutter, however, completes its movement and causes the release of the pin 56 from the cam-surface 72 of the bolt, thereby permitting said pin 56 to spring into engagement with the teeth of the annular rack 60 ready for another turning of the cylinder 34. After the finger 64 engages the pin 24 it will be understood that the bracket 27 comes into contact with said pin 24, and thereby prevents further rotation of the camera box or casing in that direction, and immediately following this contact the catch 28 rides over the beveled edge of the stud 24, and thereby prevents rotation of the camera in the reverse direction, so that the camera box or casing is held against rotation in any direction.

While I have herein shown and described many details of construction, yet I do not wish to be understood as confining myself thereto, inasmuch as it will be obvious that many of these details may be changed or varied without departing from the broad scope and spirit of my invention.

What I claim as my invention is—

1. In a photographic camera, the combination, of a box or casing, a revoluble cylinder within the box or casing and located to the rear of the light-opening of said box or casing to thereby form the focal plane, and a sensitized film passed in front of the exposed portion of the cylinder between said cylinder and the light-opening, and being in contact with the cylinder, so as to be moved thereby.

2. In a photographic camera, the combination, of a box or casing, a revoluble cylinder within the box or casing and located to the rear of the light-opening of said box or cylinder to thereby form the focal plane, and a sensitized film passed in front of the exposed portion of the cylinder between said cylinder and the light-opening, and in contact with said exposed portion, so as to permit the light from the lens, during an exposure of the view, to strike the sensitized film upon a segment of the periphery of the cylinder.

3. In a photographic camera, the combination, of a box or casing, a revoluble cylinder within the box or casing and located to the rear of the light-opening of said box or casing to thereby form the focal plane, a sensitized film passed in front of the exposed portion of the cylinder between said cylinder and the light-opening, and being in contact with the cylinder so as to be moved thereby, a pinion on the shaft of the cylinder, and a gear in mesh with the pinion, the cylinder, pinion, and gear being so proportioned as to carry progressively into the line of light from the lens, during one complete revolution of the camera, a length of film equal to the circumference of a circle, the radius of which is the equivalent focal length of the lens.

4. In a photographic camera, the combination, of a box or casing, a cylinder therein, said cylinder adapted to have a sensitized film against the periphery thereof, so as to permit light from the lens, during an exposure of the view, to strike the sensitized film, means for revolving the cylinder and causing the sensitized film to move synchronously therewith, and a feed-roll from which the sensitized film is unwound, said feed-roll being journaled in suitable spring-bearings, and thereby pressed into contact with the cylinder.

5. In a photographic camera, the combination, of a box or casing, a cylinder therein adapted to have a sensitized film against the periphery thereof, a feed-roll pressed into contact with the cylinder, and a friction or pressure roll also pressed into contact with the cylinder.

6. In a photographic camera, the combination, of a box or casing, a cylinder therein adapted to have a sensitized film against the periphery thereof, a feed-roll pressed into contact with the cylinder, a friction or pressure roll also pressed into contact with the cylinder, and a suitably-actuated winding-roll to which the film is connected, said film being thereby carried through the light of the lens.

7. In a photographic camera, the combination, of a box or casing, a cylinder therein, said cylinder adapted to have a sensitized film against the same so as to permit light from the lens, during an exposure of the view, to strike the film, means for revolving the cylinder, and causing the sensitized film to be moved thereby, and a shutter adapted to be automatically opened at the initial point of the view and to be automatically closed at the terminal point of the view.

8. In a photographic camera, the combination, of a box or casing, a cylinder therein having an annular rack therearound, said cylinder adapted to have a sensitized film against the same so as to permit light from the lens, during an exposure of the view, to strike the film, a shutter parallel with the cylinder, a spring-strip carried by said shutter and having a pin extending inwardly therefrom, a bolt carried by the shutter, said bolt having an elongated slot or slots through which a set screw or screws pass, and one end of said bolt being bifurcated and formed with a cam-surface, through which bifurcated portion the pin extends, and said bolt also provided with a projecting stud, said stud adapted to strike contacts so as to limit the movement of the bolt in opposite directions, a stop adapted to contact with the shutter when said shutter reaches a closed position, a spring adapted to engage the shutter when said shutter is brought to an open position, means for releasing the spring from engagement with the shutter after the end of the view is reached, and means for returning the shutter to a closed position after being so released.

9. In a photographic camera, the combination, of a camera box or casing, a cylinder therein, means for rotating said cylinder, a shutter opened by the rotation of the cylinder, a spring adapted to engage the shutter when said shutter is turned to an open position, a shaft having a crank at one end, and means for operating the shaft so as to cause the crank to act on the spring and release it from engagement with the shutter at the time the terminal end of the view is reached.

10. In a photographic camera, the combination, of a support, a toothed wheel loose on said support, means for holding the wheel fast to the support, a revoluble camera box or casing, a cylinder therein, the shaft of said cylinder extending through the box or casing, and a pinion on the cylinder-shaft meshing with the wheel on top of the support.

11. In a photographic camera, the combination, of a support having an opening therethrough, a toothed wheel resting on the support, said wheel provided with a depending post extending through the opening of the support, a nut adapted to be turned on the lower threaded end of the post against the support, a revoluble camera box or casing, a cylinder therein, the shaft of said cylinder extending through the box or casing, and a pinion on the cylinder-shaft meshing with the wheel on the top of the support.

12. In a photographic camera, the combination, of a support, a toothed wheel loose on the support, means for holding said wheel fast to the support, a swinging camera box or casing, a cylinder within said box or casing, a pinion on the shaft of the cylinder, said pinion meshing with the wheel which is loose on the support, a toothed wheel loose on the axis or pivot of the box or casing, said wheel being above the wheel which rests on the support, a dog carried by the latter wheel and adapted to engage the teeth of the wheel above the same, and a catch carried by the box or casing and adapted to engage a projecting stud or pin from the latter wheel.

13. In a photographic camera, the combination, with a swinging camera box or casing, of a loose ring provided with a pointer adapted to indicate the terminal point of a view.

14. In a photographic camera, the combination, of a support provided with an opening, a toothed wheel resting on said support and provided with a depending tubular post extending through the opening of the support, a nut engaging a threaded portion of the tubular post and adapted to be turned up against the support, a camera box or casing provided with a depending axis or pivot passing through the tubular post, a cylinder within the box or casing, and a pinion mounted on the shaft of said cylinder and adapted to mesh with the wheel mounted above the support.

15. In a photographic camera, the combination, of a support provided with an opening, a ring fitting loosely around the support and provided with a projecting pointer, a toothed wheel resting on the support, and provided with a depending tubular post extending through the opening of the support, a nut engaging the threaded end of said post and adapted to be turned up against the support, a camera box or casing provided with a pointer and also having an axis or pivot passing through the tubular post, a toothed wheel loose on the axis or pivot of the box or casing, said wheel provided with a projecting stud, a pawl pivoted to the wheel which rests on the support, said pawl adapted normally to engage the teeth of the wheel above, a catch carried by the camera box or casing, a cylinder within the box or casing, and a pinion on the shaft of the cylinder and adapted to mesh with the wheel which rests on the support.

16. In a photographic camera, the combination, of a support, a toothed wheel resting on said support, means for permitting said wheel to be loose on the support, or fast thereon, a camera box or casing, a wheel on the axis or pivot of said camera box or casing, means for permitting an independent rotation of said wheel, means for clamping the camera box or casing and the two wheels so as to be rotated therewith, and for unclamping said box or casing to provide for an independent rotation thereof, a pointer for indicating the terminal end of the view, means for limiting the transit of the camera to the terminal point, a cylinder in the box or casing, and a pinion mounted on the shaft of the cylinder, said pinion meshing with the wheel above the upper portion of the support.

17. In a photographic camera, the combination, of a swinging camera box or casing, a wheel, mechanism carried by said wheel for indicating the end of the view and terminating the transit of the camera, and locking mechanism for preventing the camera from revolving backward.

18. In a photographic camera, the combination, of a swinging box or casing adapted for the progressive movement therein of a sensitized film across the line of light, of a marking device adapted to act on the sensitized film in order to delineate thereon a divisional line in order to permit of the separating of the different views.

19. In a photographic camera, the combination, of a swinging box or casing adapted for the progressive movement therein of a sensitized film across the line of light, a carriage, means for actuating said carriage, a spring carried by the carriage, a pencil or marking device carried by the spring and adapted to act on the sensitized film to draw thereon a separating-line for the different views, and a device acting on the spring to throw the marking device out of contact with the sensitized film, when the carriage is out of operation.

In testimony whereof I affix my signature in presence of two witnesses.

LE CLAIRE STARK.

Witnesses:
A. L. MORSELL,
ANNA V. FAUST.